Patented June 6, 1933

1,912,378

UNITED STATES PATENT OFFICE

RALPH N. LULEK, OF WILMINGTON, DELAWARE, ASSIGNOR TO E. I. DU PONT DE NEMOURS & COMPANY, OF WILMINGTON, DELAWARE, A CORPORATION OF DELAWARE

VAT COLOR OF THE ANTHRAQUINONE SERIES AND PROCESS OF MAKING IT

No Drawing.   Application filed December 16, 1926.   Serial No. 155,339.

This invention relates to the development of new brown vat colors of the anthraquinone series. More particularly it relates to the process of, and the product resulting from fusing anthrimide compounds containing a free amino group with anhydrous aluminum chloride and then benzoylating the free amino group.

The condensation, in a solvent and in the presence of copper, a copper salt, sodium carbonate (anhydrous) or sodium acetate (anhydrous), of amino-anthraquinones with a sufficient quantity of a chlor-anthraquinone to substitute all of the amino groups is known to yield the dianthraquinonylamines or trianthraquinonyldiamines, called di- or trianthrimides, respectively. Vat colors have been heretofore obtained by fusing these intermediates with anhydrous aluminum chloride at high temperatures, as disclosed in the Patent 999,798 of Kalischer. The vat colors so produced generally possess good fastness to washing, but vary in their fastness to light and chlorine.

This invention has as an object the production of colors of improved properties from the aluminum chloride fusion of anthrimides.

I have discovered that if the anthrimides employed for fusion with the anhydrous aluminum chloride contain a free amino group, that is an unsubstituted NH$_2$ group attached to the nucleus of the anthrimide, the products of the fusion will react with benzoyl chloride and give dyes far superior to the dyes of this type hitherto obtained. In order to obtain anthrimides containing a free amino group an amino-anthranquinone is condensed with a quantity of chlor-anthraquinone which is insufficient to substitute all of the amino groups of the amino-anthraquinone. At least one amino group, therefore, remains unsubstituted in the resulting anthrimide.

For example, if 1:5-dichlor-anthraquinone (one molecular proportion) is condensed with 1:5-diamino-anthraquinone (one molecular proportion) a dianthrimide is formed with one free chlorine and one free amino group.

The existence of a free amino group in the dianthrimide is indicated by the fact that the compounds so formed react with benzoyl chloride to give new compounds in contradistinction to the intermediates heretofore employed for fusion with aluminum chloride.

If this compound is fused with anhydrous aluminum chloride at high temperatures, a compound of indefinite constitution is obtained. If this product is afterwards benzoylated and purified by oxidizing it with sodium hypochlorite solution it yields a golden brown vat color of extraordinary fastness.

The remarkable fastness of the new vat colors is apparently due to the presence of the benzoyl-amino group.

The process is disclosed in detail by the following examples. It is to be understood, however, that the reagents, proportions and conditions therein set forth are purely illustrative:

(I) Thirty parts of 1:5-diamino-anthraquinone, 35 parts of 1:5-dichlor-anthraquinone, 12 parts of anhydrous sodium acetate, 6 parts of cuprous chloride, and 1 part of copper bronze are boiled in 450 parts of nitrobenzene for four hours. The hot condensation mass is diluted with 300 parts of solvent naphtha and filtered at 100° C. After washing with nitrobenzene, alcohol, hydrochloric acid and water the anthrimide is dried.

Ten parts of dianthrimide are added to 45 parts of molten, anhydrous aluminum chloride and heated to 190° C. for one and one-half hours. The mass is poured into dilute hydrochloric acid, boiled, filtered, washed acid free, and dried.

Ten parts of the resulting indefinite compound are boiled in 100 parts of nitrobenzene with 6 parts of benzoyl chloride for two hours. The benzoylated compound is filtered cold, washed with nitrobenzene and alcohol, and dried. As a means of purification it is dissolved in monohydrate and poured on ice, filtered, washed acid free, and the wet cake oxidized with 1000 parts of 10% hypochlorite solution at 50–70° C. for five to six hours.

The dyestuff is filtered off, washed with water and pasted.

The dry powder shows a yellowish-brown color soluble in concentrated sulphuric acid (II) Ten parts of the condensation product obtained by condensing 1-amino-6-chlor-anthraquinone with itself are fused with 45 parts of anhydrous aluminum chloride with or without the addition of 12 parts salt at 190–200° C. for two hours. The melt is poured into dilute hydrochloric acid, boiled, filtered, washed free from acid, and dried.

Ten parts of this product are boiled with 100 parts of nitrobenzene and 6 parts of benzoyl chloride for two hours, allowed to cool, filtered, washed with nitrobenzene and alcohol and dried.

Ten parts of the benzoylated product are dissolved in 200 parts concentrated sulphuric acid, precipitated with water, filtered, washed free from acid and treated with 10% sodium hypochlorite solution for five to six hours at 50–60° C.

The dry powder shows a reddish-brown color, soluble in sulphuric acid with dark red color.

It will of course be understood that other anthraquinones than those disclosed in the examples, and other proportions, may be employed in the condensation provided an anthrimide containing a free amino group is produced. For example, a dyestuff similar to that produced by the procedure of example I is obtained by condensing one molecular proportion of 1:5-dichlor-anthraquinone with two molecular proportions of 1:5-diamino-anthraquinone, fusing the resulting diamino-alpha-alpha'-alpha''-trianthrimide with aluminum chloride and benzoylating the unsubstituted amino groups. Also, of course, other metal chlorides than anhydrous aluminum chloride, for example ferric chloride, may be used.

The new vat colors dye cotton and artificial silk from reddish vats in golden-brown to reddish-brown shades, very fast to washing, light, chlorine, perspiration, rubbing, alkali, acid, etc. These colors are suitable for any method of application, as padding, dyeing on the Franklin machine, printing, etc.

I claim:

1. In the process of producing a vat dye of the anthraquinone series, the step of condensing not more than one molecular proportion of a chlor-anthraquinone with a molecular proportion of alpha-alpha-diamino-anthraquinone and fusing the resulting anthrimide with anhydrous aluminum chloride.

2. The process of producing a vat dye of the anthraquinone series, which comprises condensing a chlor-anthraquinone compound which may contain an amino group with an amino-anthraquinone compound which may contain chlorine in the nucleus, the molecular quantity employed of the first compound being at least one less than the total number of amino groups contained in the condensed molecules prior to their condensation, fusing the resulting anthrimide with a metal chloride and benzoylating.

3. The process of producing a vat dye which comprises fusing an anthrimide containing at least one free amino group with anhydrous aluminum chloride and thereafter effecting benzoylation of the amino group or groups.

4. The process of producing a vat dye which comprises fusing an anthrimide containing at least one free amino group with anhydrous aluminum chloride effecting benzoylation of the amino group or groups and purifying the product by oxidation.

5. The process of producing a vat dye which comprises fusing with anhydrous aluminum chloride and benzoylating the condensation products of molecular proportions of 1:5-diamino-anthraquinone and 1:5-dichlor-anthraquinone.

6. As an intermediate in the manufacture of a vat dye the dye compound resulting from fusing an anthrimide free from free amino groups in the positions ortho to the imide radical containing a free amino group with anhydrous aluminum chloride, said free amino group being present in the product.

7. A vat dye resulting from fusing an anthrimide containing a free amino group with anhydrous aluminum chloride, thereafter effecting benzoylation of the amino group or groups and purifying the product by oxidation.

8. A vat dye resulting from fusing with aluminum chloride and benzoylating the condensation products of molecular proportions of 1:5-dichlor-anthraquinone and 1:5-diamino-anthraquinone.

9. The vat dye obtainable by fusing with anhydrous aluminum chloride a free amino anthrimide containing only one amino group and having the positions ortho to the imino group or groups free from amino groups and after said fusion effecting benzoylation of the free amino group.

In testimony whereof I affix my signature.

RALPH N. LULEK.